(12) United States Patent
Hartert et al.

(10) Patent No.: US 7,905,256 B2
(45) Date of Patent: Mar. 15, 2011

(54) PENETRATION-OBSTRUCTING ARTICLE

(75) Inventors: Rüdiger Hartert, Wuppertal (DE);
Christian Böttger, Remscheid (DE)

(73) Assignee: Teijin Aramid GmbH, Wuppertal (DE)

( * ) Notice: Subject to any disclaimer, the term of this patent is extended or adjusted under 35 U.S.C. 154(b) by 129 days.

(21) Appl. No.: 12/453,428

(22) Filed: May 11, 2009

(65) Prior Publication Data

US 2009/0288235 A1    Nov. 26, 2009

Related U.S. Application Data

(60) Provisional application No. 61/129,085, filed on Jun. 4, 2008.

(30) Foreign Application Priority Data

May 26, 2008  (EP) .................................... 08156914

(51) Int. Cl.
  *F41H 1/02*   (2006.01)
  *D03D 11/00*  (2006.01)
  *D03D 25/00*  (2006.01)

(52) U.S. Cl. ................. 139/409; 139/383 R; 139/420 R; 2/2.5

(58) Field of Classification Search ... 2/2.5; 139/383 R, 139/408–413, 420 R, 426 R, 420 A, DIG. 1; 89/901, 36.05, 908, 909, 914, 915, 916, 921, 89/922; 428/911
See application file for complete search history.

(56) References Cited

U.S. PATENT DOCUMENTS

| | | | | |
|---|---|---|---|---|
| 3,771,418 A * | 11/1973 | Gulbierz et al. | ............. | 89/36.02 |
| 5,100,713 A | 3/1992 | Homma et al. | | |
| 5,565,264 A * | 10/1996 | Howland | ..................... | 442/246 |
| 5,668,344 A | 9/1997 | Bornstein | | |
| 5,903,920 A * | 5/1999 | Granqvist | ......................... | 2/2.5 |
| 6,103,646 A * | 8/2000 | Chiou | ......................... | 442/244 |
| 6,127,291 A * | 10/2000 | Coppage et al. | ............ | 442/135 |
| 6,133,169 A * | 10/2000 | Chiou et al. | ................. | 442/234 |
| 6,147,018 A * | 11/2000 | Chiou | ......................... | 442/243 |
| 6,151,710 A * | 11/2000 | Bachner, Jr. | ..................... | 2/2.5 |
| 6,227,257 B1 * | 5/2001 | Griffiths | ..................... | 139/408 |
| 6,266,819 B1 * | 7/2001 | Bachner, Jr. | ..................... | 2/2.5 |
| 6,370,690 B1 * | 4/2002 | Neal | ............................... | 2/2.5 |
| 6,526,862 B1 * | 3/2003 | Lyons | ......................... | 89/36.05 |
| 6,651,543 B2 * | 11/2003 | Park | ........................... | 89/36.02 |

(Continued)

FOREIGN PATENT DOCUMENTS

JP    A 61-275440    12/1986

(Continued)

OTHER PUBLICATIONS

Co-pending U.S. Appl. No. 12/453,434, filed May 11, 2009.

(Continued)

*Primary Examiner* — Bobby H Muromoto, Jr.
(74) *Attorney, Agent, or Firm* — Oliff & Berridge, PLC

(57) ABSTRACT

A penetration-obstructing article comprising a multiplicity of fabric layers of fibers having elongation at break of less than 8%, measured according to EN 12562, wherein there are at least two groups of fibers in at least one single fabric layer, wherein the regions of a first group have a first fabric density DG1 according to Walz of from 8% to 80% and wherein the regions of a second group have a second fabric density according to Walz of from 8% to 80% and wherein the difference between DG1 and DG2 is at least 3%.

23 Claims, 1 Drawing Sheet

U.S. PATENT DOCUMENTS

| | | | | |
|---|---|---|---|---|
| 6,662,369 | B2 * | 12/2003 | Fuchs et al. | 2/2.5 |
| 6,705,197 | B1 * | 3/2004 | Neal | 89/36.05 |
| 6,737,368 | B2 * | 5/2004 | Chiou | 442/134 |
| 6,890,871 | B2 * | 5/2005 | Bottger et al. | 442/135 |
| 6,911,247 | B2 * | 6/2005 | Howland | 428/114 |
| 7,132,380 | B2 * | 11/2006 | Bottger et al. | 442/135 |
| 7,150,046 | B2 * | 12/2006 | Bottger et al. | 2/2.5 |
| 7,153,790 | B2 * | 12/2006 | Bottger et al. | 442/134 |
| 2001/0031593 | A1 * | 10/2001 | Fuchs et al. | 442/261 |
| 2003/0022583 | A1 * | 1/2003 | Thomas et al. | 442/403 |
| 2003/0109188 | A1 * | 6/2003 | Hartert et al. | 442/135 |
| 2003/0129900 | A1 * | 7/2003 | Chiou | 442/134 |
| 2005/0066400 | A1 * | 3/2005 | Bottger et al. | 2/2.5 |
| 2006/0037121 | A1 * | 2/2006 | Park | 2/2.5 |
| 2007/0105468 | A1 * | 5/2007 | Chiou et al. | 442/181 |
| 2007/0232173 | A1 | 10/2007 | Bain | |
| 2008/0104735 | A1 * | 5/2008 | Howland | 2/2.5 |
| 2009/0291280 | A1 * | 11/2009 | Hartert et al. | 428/218 |

FOREIGN PATENT DOCUMENTS

| | | |
|---|---|---|
| WO | WO 02/14588 A1 | 2/2002 |

OTHER PUBLICATIONS

New U.S. Appl. No. filed on May 11, 2009 in the name of Rudiger Hartert et al. that claims priority to U.S. Provisional Application U.S. Appl. No. 61/129,124 filed on Jun. 5, 2008.

International Preliminary Report on Patentability for International Application No. PCT/EP2009/056115 mailed Dec. 16, 2010.

International Preliminary Report on Patentability for International Application No. PCT/EP2009/056116 mailed Dec. 16, 2010.

* cited by examiner

PENETRATION-OBSTRUCTING ARTICLE

CROSS REFERENCE

This nonprovisional application claims the benefit of U.S. Provisional Application No. 61/129,085 filed Jun. 4, 2008 and European Application No. 08 156914.7 filed May 26, 2008, which are incorporated by reference herein in their entirety.

BACKGROUND

The present disclosure relates to an article to obstruct penetration, the article comprising layers of fabric made of yarns composed of fibers having elongation at break of less than 8%, as measured according to EN 12562.

Articles to obstruct penetration, made of layers of fabric, are generally known. The document JP 612 75 440 A discloses an antiballistic vest of layers of fabric in which the yarns are in a satin weave. In contrast to yarns in a linen weave, for instance, the yarns in a satin weave are less strongly fixed within the fabric structure. According to the document JP 612 75 440 A, that improves the energy absorption by the vest of a bullet, compared with the energy absorption of a vest having the fabric layers in a linen weave. However, difficulty of handling fabric layers having a satin weave is a disadvantage. For example, cutting and layering of such fabric layers in production of an antiballistic object is very costly.

The document WO 02/14588 A1 discloses the use of laminated fabric layers in which the fabric layers have a satin weave for antiballistic objects. But there is a disadvantage in the use of laminated satin-weave fabric layers in that the high ability of the open satin weave to absorb energy is lost because of the lamination. A further disadvantage is that satin-woven fabric layers allow high trauma from a shot. Thus satin weaves in fabrics with antiballistic action exhibit not only difficulty in handling the fabric layers but also bad trauma values.

It is, therefore, one objective of the present disclosure to make available an article of the sort named initially to obstruct penetration which at least avoids the disadvantages of the state of the art and can nevertheless be produced with good antiballistic properties.

SUMMARY

The objective described above may be attained with a penetration-obstructing article comprising a multiplicity of layers of fabric having yarns of fibers with less than 8% elongation at break according to EN 12562. In at least one single layer of fabric, these are at least two groups of regions, in which the regions of a first group exhibit a first fabric density DG1, according to Walz, of 8% to 80%, and in which the regions of a second group exhibit a fabric density DG2, according to Walz, of 8% to 80%, and in which the difference between DG1 and DG2 is at least 3%.

DETAILED DESCRIPTION

Figure 1:
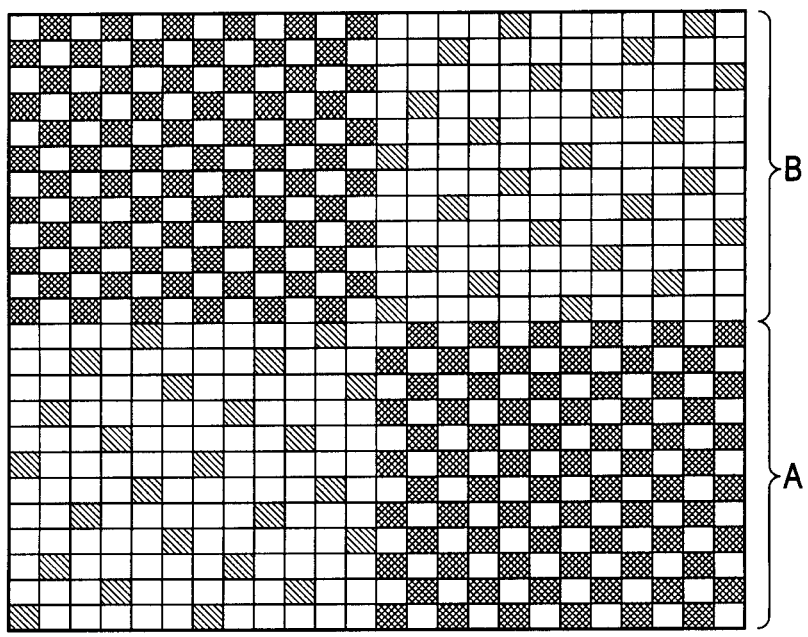
FIG. 1 shows schematically the weave pattern of a fabric layer for producing the penetration-obstructing article according to the present disclosure.

The penetration-obstructing article described herein may include a multiplicity of layers of fabric of fibers having elongation at break of less than 8%, such as less than 5%, or less than 3.5%, as measured according to EN 12562.

The difference of at least 3% between DG1 and DG2 must be understood as an absolute value, so that DG1 can also be greater than DG2 without the difference being a negative value.

In embodiments, the fabric density DG1 is from 8% to 31%, such as from 8% to 25% 8% to 20%.

In further embodiments, the fabric density DG2 is from 32% to 80%, such as from 32% to 70%, or from 32% to 50%.

The fabric density according to Walz is determined by the following formula:

$$DG = (d_k + d_s)^2 \times f_k \times f_s$$

in which $d_k$ = diameter of the substance of the warp yarn in mm;
$d_s$ = diameter of the substance of the weft yarn in mm;
$f_k$ = warp fibers per cm
$f_s$ = weft fibers per cm.

The diameter of the substance of the yarn, $d_k$ or $d_s$, is calculated as follows:

$$d = \frac{\sqrt{\text{Denier}}}{88.5 \times \sqrt{\text{Density}}}$$

in which d is either $d_k$ or $d_s$, the denier of the yarn in question is in dtex, and the density of the yarn is used in g/cm$^3$.

The fabric density calculated from the formula applies for linen-weave fabric. If the weave is other than linen weave, a weave correction factor must be included in the calculation. The following values, for example, are used for this weave correction factor in fabrics having special kinds of weaves:

| Panama weaves 2:2 | 0.56 |
| Twill weaves 2:1 | 0.70 |
| Twill weaves 2:2 | 0.56 |
| Twill weaves 3:1 | 0.56 |
| Twill weaves 4:4 | 0.38 |
| Satin weave 1:4 | 0.49 |
| Satin weave 1:5 | 0.44 |

The fabric density, DG, calculated from the formula according to Walz is multiplied by these correction factors. The fabric density is reported in percent.

By means of the regions with different fabric densities according to Walz within each fabric layer, it is possible advantageously to use the advantages of high fabric densities or low fabric densities quite deliberately where they are needed within a fabric layer. For instance, marginal areas can be made up of a fabric layer having a comparatively higher fabric density than areas in the center of the fabric layer.

The elongation at break is determined according to the standard EN 12562 in the current 1999 version.

If untwisted multifilament yarns are examined, there is a twist gain of the yarns as stated in the standard EN 12562. If yarns with staple fibers or other already-twisted yarns are used to measure elongation at break, the determination of the elongation at break is essentially the same. But if the staple fiber yarns or the twisted yarns already have a gain from the twist, the additional twist gain of the staple fiber yarns or the other twisted yarns does not occur.

In embodiments, the regions of the first group may have a first type of weave, and the regions of the second group may have a second type of weave. The first type of weave may differ from the second type of weave. In this way, the different fabric densities of the regions of the first group, in comparison with the regions of the second group, can be obtained advantageously by means of the different weave types between the regions of the first group compared with the regions of the second group. Thus, different fabric densities can be produced advantageously, for example, in spite of using yarns having the same deniers in both regions.

In embodiments, the regions of the first group have satin weave as the first weave type. The satin weave is may be a 1/5 or 1/4 satin weave.

The regions of the second group may have a twill weave or a 1/1 linen weave as the second type of weave. If the satin weave in the regions of the first group is a 1/5 weave, the twill weave of the second group may be a 2/1 weave. If there is a 1/4 satin weave in the regions of the first group, the regions of the second group may have a 2/3 or a 1/4 twill weave or a 1/1 linen weave.

It is likewise desired for the yarns of the regions of the first group to have a first yarn denier and the regions of the second group a second yarn denier. Here, the first yarn denier may differ from the second yarn denier. However, it is also desirable for the first yarn denier to be essentially the same as the second yarn denier. If different yarn deniers are used within the regions of the first group, compared with the regions of the second group, a difference in fabric density can be produced between the regions of the first group and the regions of the second group even if the same weave type is used in the regions of the first group and the regions of the second group. The first yarn denier and the second yarn denier can be in the range of 100 dtex to 8,000 dtex. However, if the two regions have different weave types, then the difference in fabric density due to that can be increased advantageously by using different yarn deniers in the different regions.

It is desirable for the regions of the first group to have a yarn denier of 100 dtex to 1,000 dtex, and the regions of the second group to have a yarn denier of 1,050 dtex to 8,000 dtex.

It is further desirable for the fabric layer in the regions of the first group to have a first thread count and that in the regions of the second group to have a second thread count. The first thread count and the second thread count can be the same or different, and can be in the range of from 2 threads/cm to 50 threads/cm. It is especially desirable for the fabric layer in the regions of the first group to have a first thread count of 2 threads/cm to 10 threads/cm and the regions of the second group to have a second thread count of 10.1 threads/cm to 50 threads/cm.

It should be apparent that the fabric densities according to Walz in the regions of the first group and the regions of the second group can be influenced by the factors: weave type, yarn denier/type and thread count. If the regions of the first group differ from the regions of the second group by just one of those factors, that can produce a different fabric density according to Walz between the regions of the first group and the regions of the second group. Obviously, the regions of the first group and the regions of the second group can also differ with respect to two, or all, of the factors.

Quite generally, the fabric layers, or a fabric layer, for producing the article according to the present disclosure can, independently of the existing weaves or thread counts, have yarns in the regions of the first group and the regions of the second group with yarn deniers of about 100 dtex to about 8,000 dtex. Furthermore, the fabric layers or a fabric layer for producing the article according to the present disclosure can, independently of the existing weaves or yarn deniers, have a thread count of 2 threads/cm to 50 threads/cm. Obviously, the fabric layers to produce the article according to the present disclosure can, independently of the existing thread counts or yarn deniers in the regions of the first group and the regions of the second group, have a linen weave or a twill weave or a satin weave.

It is preferable for the regions of the second group to make up an area proportion of from 20% to 80% of the total area of the fabric layer, such as from 30% to 60%, or from 40% to 50%, of the total area of the fabric layer. The regions of the second group should desirably not be made continuous within the fabric layer. Rather, the fabric layer may have a multiplicity of regions of the second group, with the regions of the second group being separated from each other, for example, by a multiplicity of regions of the first group, but still with points at which the regions of the second group contact each other. There can, accordingly, also be a multiplicity of non-continuous regions of the first group within one fabric layer. In addition, it is also possible for there to be more than two groups of regions with different fabric densities according to Walz within the fabric layer. The regions of the first group and the regions of the second group may each extend over at least one repeat of the selected weave.

It is desirable for the regions of the first group and the regions of the second group to be mutually arranged in a strip pattern or a checkerboard pattern. Other patterns are also possible, such as a diamond pattern or a triangular pattern. It is also further possible for regions of the first or second group to occur predominantly in the marginal region of the fabric layer (like window frames, for instance) and for the regions of each of the other groups to occur in the central region of the fabric layer. With two successive fabric layers of the penetration-obstructing article, the successive fabric layers can be structured essentially the same as each other, or different from each other. For a different structure, for example, a first fabric layer can have regions of the first group in the marginal region and regions of the second group in the central region, while a second fabric layer has regions of the second group in the marginal region and regions of the first group in the central region.

It is further desirable for the yarns for producing the fabric layer of the article to obstruct penetration to be aramid yarns, yarns of polyethylene having an ultra-high molecular weight, yarns of polypropylene having an ultra-high molecular weight, yarns of polybenzoxazole or yarns of polybenzothiazole. For example, yarns made of fibers of poly(p-phenylene terephthalamide), such as are marketed as TWARON® by Teijin Aramid GmbH, are suitable for use herein. It is also possible for there to be different yarns in a fabric layer, contributing to a partial variation of the fabric density. The fabric layers can be made of multifilament yarns or staple fiber yarns or of mixtures of the two types of yarns. It is desired for the fibers of the yarns to have strengths greater than 900 MPa, such as strengths greater than 1100 MPa, as measured according to ASTM D-885.

The penetration-obstructing article according to the present disclosure may be used to produce protective clothing such as bullet-resistant vests. Obviously, the article according to the disclosure can, by appropriate forming of the fabric layers, also assure protection against stabbing.

FIG. 1 shows schematically the weave pattern of a fabric layer for producing the penetration-obstructing article described herein. The A regions the fabric layer has a 1/1 linen weave with a fabric density according to Walz of, for example, 37%. The fabric layer in the B regions has a 1/5 satin weave (consecutive numbers 2,2,3,4,4), such that the fabric density according to Walz can, for example, be 16%. Then, the B regions are regions according to the disclosure of a first group and occur in a checkerboard arrangement with respect to the A regions, which represent the regions of a second group. The weave patterns shown in FIG. 1 indicate the fabric layers from which the package according to Example 1 is formed for the subsequent shooting tests.

Figure 2:
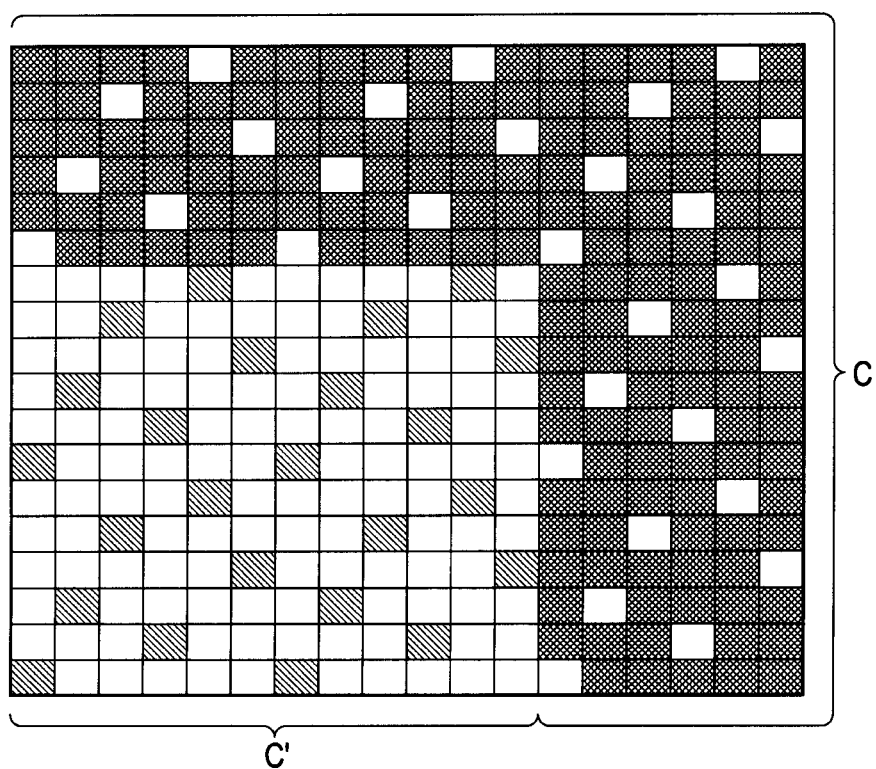
FIG. 2 shows schematically the weave pattern of a comparison fabric layer.

FIG. 2 shows schematically the weave pattern of a fabric of satin weave with the corresponding negative. In the C regions shown the fabric layer has a 5/1 satin weave (consecutive numbers 2,2,3,4,4), while the C' regions have a 1/5 satin weave (consecutive numbers 2,2,3,4,4). In spite of different weave types in the C and C' regions, the fabric density according to Walz is 16%, for example, in both regions. In the example embodiment of FIG. 2, the 1/5 satin weave (region C') was made with two repeats and the 5/1 satin weave (region C) with one repeat. The weave patterns shown in FIG. 2 show the fabric layers from which the package according to Comparison Example 3 were constructed for the subsequent shooting test.

EXAMPLES

In the Example and in the Comparison Examples, the yarns used to make the fabric layers are aramid filament yarns having a strength of 3384 MPa according to ASTM D885 and an effective denier of 960 dtex. They were purchased from Teijin Aramid GmbH as TWARON® 930 dtex f1000. The aramid filament yarns have elongation at break of 3.45%, as measured according to EN 12562. The aramid filament yarns have a density of 1.44 g/cm$^3$.

Numerous packages, each made up of a multiplicity of fabric layers, were examined.

Comparison Example 1

The article, or the package, according to Comparison Example 1 comprises 26 superimposed fabric layers, with each fabric layer having 1/1 linen weave and a thread count of 10.5/cm×10.5/cm. The fabric density according to Walz is 37% for each of these fabric layers.

Comparison Example 2

The package according to Comparison Example 2 likewise comprises 26 fabric layers, but with each fabric layer having a 1/5 satin weave (consecutive numbers 2,2,3,4,4). The thread count is 10.5/cm×10.5/cm. The fabric density according to Walz is 16% for each of these fabric layers.

Example 1

The article of Example 1 comprises 26 fabric layers, with two groups of regions having different fabric densities. Each fabric layer used to make the article according to the present disclosure has, as regions of the first group, regions with 1/5 satin weave (consecutive numbers 2,2,3,4,4) and thread counts of 10.5/cm×10.5/cm. For this first group the fabric density according to Walz is 16%. The regions of a second group are formed by regions within the fabric layer having 1/1 linen weave with thread count of 10.5/cm×10.5/cm. The fabric density according to Walz for the regions of this second group is 37%. The ratio of regions with linen weave to regions with satin weave is 1:1. The satin weave has two repeats in the warp and weft directions, while the linen weave has six repeats in the warp and weft directions. The fabric densities according to Walz were calculated according to the formula shown previously as follows:

$$DG_{[second\ group,\ 1/1\ linen\ weave;\ 960\ dtex;\ 10.5\times10.5\ per\ cm]}=37\%$$

$$DG_{[first\ group,\ 1/5\ satin\ weave;\ 960\ dtex;\ 10.5\times10/5\ per\ cm]}=37\%\times0.44\ (correction\ factor)=16\%$$

The fabric layers of the article according to the present disclosure were produced by feeding in filament groups as dobby goods on a gripper loom with a dobby loom. Six shafts are required to feed the yarns to make the regions in the linen weave, and six shafts are required to feed the yarns to make the regions with satin weave.

Comparison Example 3

The package of Comparison Example 3 comprises 26 fabric layers. The fabric layers are made with the method described in Example 1 such that each fabric layer has two different weaves. The fabric density according to Walz within the fabric layer is the same, in spite of different weaves. A 1/5 satin weave (sequence numbers 2,2,3,4,4) and a 5/1 satin weave (sequence numbers 2,2,3,4,4) were used as the weaves. The fabric density according to Walz is 16% in all the regions.

Comparison of the Ballistic Ability

Three packages of each of the Comparison Examples 1 to 3 and Example 1 were tested for each type of ammunition. Each package (~5.2 kg/m$^2$) had 26 layers of fabric, and was fired on eight times with each type of ammunition at a range of 10 meters to determine the $V_{50}$ value and the absorbed energy. The $V_{50}$ value is the bullet velocity at which there is a 50% probability of penetration. A Weible plasticine block was placed behind each of the packages. The energy absorption was calculated as $\frac{1}{2}mv^2$, with m being the bullet weight in kg and v the $V_{50}$ value found, in meters/second.

In a second study to check the background deformation (called trauma in the following), a Weible plasticine block was used as before. As is well known, the bulge of the side away from the threat (shooting side) is a measure of the trauma caused by a bullet. To determine the trauma, each package was placed in front of the Weible plasticine block and fired on eight times at a range of 5 meters with an approximately constant velocity in the range of 434 meters/second to 443 meters/second. Four shots were aimed at the outer region of the package and four shots at the inner region of the package. With the selected bullet velocities, there were no penetrations, just embedded bullets. The average trauma, as the depth of penetration into the plasticine, in mm, was determined from these eight shots for each design and each type of ammunition.

Tables 1 and 2 summarize the means of the results of the shooting tests.

Shooting Test 1

Fired on with Remington .44 Magnum, JHP, 15.6 g

TABLE 1

| | $V_{50}$ (m/s) | Energy absorption (J) | Trauma (mm) |
|---|---|---|---|
| Comparison Example 1 | 488 | 1858 | 50 |
| Comparison Example 2 | 493 | 1896 | 59 |
| Comparison Example 3 | 492 | 1888 | 57 |
| Example 1 | 497 | 1927 | 54 |

As shown in Table 1, the package made according to Comparison Example 2 (satin weave) has a $V_{50}$ value of 493 m/s and a corresponding energy absorption of 1896 J when struck by a .44 Magnum. To be sure, the shot trauma for such a package is 59 mm. The package from Comparison Example 1 (linen weave), on the other hand, has a bullet $V_{50}$ of 488 m/s and an energy absorption of 1858 J. In this case the trauma is only 50 mm. Thus the open satin weave (Comparison Example 2) is distinguished by higher energy absorption than the linen weave (Comparison Example 1) but the trauma is distinctly worse than for a linen weave. The article according to the present disclosure (Example 1) has a $V_{50}$ value of 497 m/s, corresponding to an energy absorption of 1927 J. The trauma for the package of Example 1 is 54 mm. It is completely surprising to one skilled in the art, and unpredictable, that the article according to the present disclosure actually exhibits greater energy absorption than the package of purely satin-weave layers, with improved antiballistic properties. It is also completely surprising that the value of the trauma with the package of Example 1, although slightly greater than the trauma value for the package according to Comparison Example 1, is distinctly improved over the trauma with the package of Comparison Example 2. On comparison of the packages according to Comparison Example 3 and Example 1, it can also be determined, surprisingly, that it is not the occurrence of different weave types within a fabric layer that causes improvement of the energy absorption and of the trauma, but that there must also be different fabric densities in the different weave types. With the combination of linen weave and satin weave within a fabric layer (Example 1) the good antiballistic property of a satin weave could be combined with the stability of a linen weave in a surprising way. A fabric layer produced in that manner exhibits better energy absorption when fired on, compared with a pure linen weave, and better trauma action compared to a pure satin weave, as well as a distinctly improved handling ability.

Shooting Test 2

Fired on with a Remington .357 Magnum, JSP, 10.3 g

TABLE 2

| | $V_{50}$ (m/s) | Energy absorption (J) | Trauma (mm) |
|---|---|---|---|
| Comparison Example 1 | 505 | 1301 | 37 |
| Comparison Example 2 | 526 | 1411 | 46 |
| Example 1 | 513 | 1342 | 41 |

According to Table 2, the energy absorption of a package of purely satin-weave layers (Comparison Example 2) when struck by a .357 Magnum is slightly above that of the article according to the present disclosure (Example 1), but the trauma when the article according to the present disclosure is used, is distinctly less than the trauma occurring when a package of purely satin-weave layers in fired on.

We claim:

1. A penetration-obstructing article comprising:
 a plurality of layers of fabric with yarns having elongation at break less than 8% as measured according to EN 12562,
 wherein there are at least two groups of regions within at least a single fabric layer of the plurality of layers, with the regions of a first group of the at least two groups having a first fabric density DG1 according to Walz of 8% to 80%, and with the regions of a second group of the at least two groups having a second fabric density DG2 according to Walz of 8% to 80% and with the difference between DG1 and DG2 of at least 3%.

2. The penetration-obstructing article according to claim 1, wherein the first fabric density DG1 is 8% to 31% and the second fabric density DG2 is 32% to 80%.

3. The penetration-obstructing article according to claim 1, wherein the first fabric density DG1 is 8% to 25% and the second fabric density DG2 is 32% to 70%.

4. The penetration-obstructing article according to claim 1, wherein the first fabric density DG1 is 8% to 20% and the second fabric density DG2 is 32% to 50%.

5. The penetration-obstructing article according to claim 1, wherein regions of the first group of the at least two groups have a first weave type and regions of the second group of the at least two groups have a second weave type, and wherein the first weave type and the second weave type are different from each other.

6. The penetration-obstructing article according to claim 5, wherein the first weave type is a satin weave.

7. The penetration-obstructing article according to claim 6, wherein the satin weave is a 1/5 or 1/4 weave.

8. The penetration-obstructing article according to claim 5, wherein the second weave type is a linen weave or a twill weave.

9. The penetration-obstructing article according to claim 8, wherein the twill weave is a 2/1 twill weave or a 1/4 twill weave and the linen weave is a 1/1 linen weave.

10. The penetration-obstructing article according to claim 1, wherein yarns in the regions of the first group of the at least two groups have a first yarn denier and yarns in the regions of the second group of the at least two groups have a second yarn denier, and wherein the first yarn denier and the second yarn denier within a fabric layer are different from each other.

11. The penetration-obstructing article according to claim 1, wherein the yarns of the regions of the first group of the at least two groups have a first yarn denier and the yarns of the regions of the second group of the at least two groups have a second yarn denier, and wherein the first yarn denier and the second yarn denier within a fabric layer are the same.

12. The penetration-obstructing article according to claim 10, wherein the first yarn denier and the second yarn denier are in the range of from 100 dtex to 8,000 dtex.

13. The penetration-obstructing article according to claim 10, wherein the first yarn denier is from 100 dtex to 1,000 dtex and the second yarn denier is from 1,050 dtex to 8,000 dtex.

14. The penetration-obstructing article according to claim 1, wherein regions of the first group of the at least two groups have a first thread count and regions of the second group of the at least two groups have a second thread count, and wherein the first thread count and the second thread count within a fabric layer are different from each other.

15. The penetration-obstructing article according to claim 1, wherein regions of the first group of the at least two groups have a first thread count and regions of the second group of the at least two groups have a second thread count, and wherein the first thread count and the second thread count within a fabric layer are the same.

16. The penetration-obstructing article according to claim 14, wherein the first thread count and the second thread count are in the range of 2 threads/cm to 50 threads/cm.

17. The penetration-obstructing article according to claim 14, wherein the regions of the first group have a thread count of 2 threads/cm to 10 threads/cm and the regions of the second group have a thread count of 10.1 threads/cm to 50 threads/cm.

18. The penetration-obstructing article according to claim 1, wherein the regions of the second group cover a surface proportion of 20% to 80% of a total surface of a fabric layer.

19. The penetration-obstructing article according to claim 1, wherein regions of the first group of the at least two groups and regions of the second group of the at least two groups are arranged in a checkerboard pattern with respect to each other.

20. The penetration-obstructing article according to claim 1, wherein regions of the first group of the at least two groups and the regions of second group of the at least two groups are arranged in a strip pattern with respect to each other.

21. The penetration-obstructing article according to claim 1, wherein the yarns comprise aramid yarns, polyethylene yarns with an ultra-high molecular weight, polypropylene yarns with an ultra-high molecular weight, polybenzoxazole yarns or polybenzothiazole yarns.

22. The penetration-obstructing article according to claim 1, wherein the fibers of the yarn have a strength greater than 900 MPa according to ASTM D885.

23. Protective clothing comprising the penetration-obstructing article according to claim 1.

* * * * *